United States Patent [19]
LaBarbera

[11] Patent Number: 5,488,705
[45] Date of Patent: Jan. 30, 1996

[54] APPARATUS FOR CONNECTING COMPUTER DEVICES

[75] Inventor: Richard S. LaBarbera, Roanoke, Va.

[73] Assignee: E. I. Du Pont de Nemours and Company, Wilmington, Del.

[21] Appl. No.: 381,468

[22] Filed: Jan. 31, 1995

Related U.S. Application Data

[63] Continuation of Ser. No. 919,649, Jul. 24, 1992, abandoned.

[51] Int. Cl.$^6$ ..................................................... G06F 13/00
[52] U.S. Cl. ................... 395/309; 395/281; 364/DIG. 1; 364/238; 364/238.2; 364/239.2; 364/239.9; 364/240; 364/241.9; 359/115
[58] Field of Search ................................. 395/309, 281; 359/115, 118; 439/77

[56] References Cited

U.S. PATENT DOCUMENTS

| | | | |
|---|---|---|---|
| 4,514,823 | 4/1985 | Mendelson et al. | 395/275 |
| 4,554,673 | 11/1985 | Stevens | 375/118 |
| 4,585,284 | 4/1986 | Koser et al. | 339/17 |
| 5,020,999 | 6/1991 | DeWitt et al. | 439/328 |
| 5,041,924 | 8/1991 | Blackborow et al. | 360/69 |
| 5,077,683 | 12/1991 | Aydin | 364/708 |
| 5,163,833 | 11/1992 | Olsen et al. | 439/61 |
| 5,170,272 | 12/1992 | Onno | 359/118 |
| 5,206,946 | 4/1993 | Brunk | 395/500 |
| 5,313,323 | 5/1994 | Patel | 359/115 |
| 5,333,271 | 7/1994 | Fredericks et al. | 395/200 |

OTHER PUBLICATIONS

IBM 3044 Fiber–Optic Channel Extender Link Models CO2 and DO2 Product Description, Publication No. GA22–7129–0, File No. S370/4300–08. Sep. 1988.

Primary Examiner—Jack B. Harvey
Assistant Examiner—Ayaz R. Sheikh
Attorney, Agent, or Firm—Woodcock Washburn Kurtz Mackiewicz & Norris

[57] ABSTRACT

An apparatus used in connecting computer devices which are coupled together by at least one dual line cable assembly. The invention comprises at least one converter adapter having an integrated circuit. The integrated circuit according to the invention is capable of (1) multiplexing and then serializing parallel bus and tag information received from one or more interfaces of one of the computer devices and sending such multiplexed serial information over a first line of the dual line cable assembly to another computer device and (2) deserializing and then demultiplexing serial bus and tag information received over a second line of the dual line cable assembly and sending such parallel and demultiplexed information to one or more interfaces of the first computer device.

32 Claims, 10 Drawing Sheets

APPARATUS FOR CONNECTING COMPUTER DEVICES

This is a continuation, of application Ser. No. 07/919,649, filed Jul. 24, 1992, now abandoned.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to an apparatus for connecting computer devices and, more specifically, where the apparatus comprises a first connector, a cable assembly, a converter adapter and a second connector.

2. Description of Related Art

FIG. 1 is a schematic illustration of a host or local mainframe computer or mainframe 2 connected to a first remote peripheral device or peripheral 4 which in turn is connected to a second remote peripheral device or peripheral 6 in a typical conventional manner. A pair of conventional bus and tag electrical assemblies 8 and 10, respectively, interconnect one channel between the mainframe 2 and the first peripheral 4. Similarly, a pair of conventional bus and tag electrical assemblies 8 and 10, respectively, interconnect one channel between the first peripheral 4 and the second peripheral 6. The bus and tag electrical assemblies 8 and 10 include a plurality of bus and tag lines. The bus lines are used to transmit information including data, I/O-device address, commands, and control information. The tag lines are used for interlocking and controlling information on the bus lines and for special sequences. For a more detailed description of the bus and tag lines and their uses see Publication GA22-6974-09 entitled International Business Machines (IBM) System/360 and System/370 I/O Interface Channel to Control Unit Original Equipment Manufacturers' Information. Additional peripherals can be connected in series to the second peripheral 6 in a similar manner.

The mainframe 2 represents an IBM 360, 370, 43XX, 30XX, or ES/9000 mainframe computer, or a plug compatible mainframe. The peripherals 4,6 are plug compatible with the mainframe 2 and can be disk drives, tape drives, servers, printers or the like. The mainframe 2 and peripherals 4, 6 have internal bus and tag serpent connectors 12–19, respectively, which mate with corresponding bus and tag serpent connectors 22–29, respectively, on ends of the electrical assemblies 8,10. The internal bus and tag serpent connectors 12–19 may be adapters which convert a first or external wiring/terminal connection scheme, grid or geometry to a second or internal wiring/terminal scheme, grid or geometry. For instance, the adapters 12–19 may convert from a spacing of 0.250 inches between centers of adjacent ones of a first or external plurality of rows and columns of terminals to a spacing of 0.125 inches between centers of adjacent ones of a second or internal plurality of rows and columns of terminals. The first or external terminals have serpent contacts for mating with serpent contacts in the bus and tag serpent connectors 22–29 on the electrical assemblies 8, 10. The serpent contacts are hermaphroditic or gender neutral as defined in Federal Information Processing Standards (FIPS) publication 60-2 published Jul. 29, 1983 entitled I/O Channel Interface. The serpent adapters are also defined in IBM Publication GA22-6974-09 previously mentioned. The adapters 12–19 may be as disclosed in U.S. Pat. No. 4,585,284.

Conventional bus and tag serpent connectors 22–29 on the electrical assemblies 8,10 do not convert the wiring/terminal connection scheme, grid or geometry. Conventional bus and tag serpent connectors 22–29 comprise a plurality of rows and columns of terminals. One end of the terminals have serpent contacts spaced 0.250 inches apart center to center for mating with the serpent contacts in the bus and tag serpent adapters 12–19 on the mainframe 2 or peripheral 4,6. The other end of the terminals in the conventional bus and tag serpent connectors 22–29 are also spaced 0.250 inches apart center to center and are soldered to ends of wires terminating from an "elephant" cable 20 having about a 0.8–1 inch diameter and containing a plurality of about 20 coaxial cables. One such elephant cable 20 is needed to transmit data between the mainframe 2 and peripheral 4, or one peripheral 4 and another peripheral 6, and is included in the bus cable assembly 8. Another such elephant cable 20 is needed to transmit control signals instructing how to handle the data and is included in the tag cable assembly 10. The elephant cables 20 are very heavy, bulky and limited in permissible length. Conventional bus and tag cable assemblies 8,10 allow only an attachment cable distance of up to 400 feet from the mainframe 2 to the last peripheral on the channel.

To accommodate the heavy and bulky elephant cables 20, computer rooms are specifically built with raised computer room flooring to run and store the cables 20 beneath the raised flooring. This hides the cables, but makes relocating the computers 2 and peripherals 4,6 very difficult without cutting and abandoning the initial cables 20.

SUMMARY OF THE INVENTION

The present invention is related to an apparatus for use in connecting a first computer device and a second computer device through a dual line cable assembly, the first and second computer devices having first and second electrical interfaces having a plurality of rows and columns of bus and tag inputs and outputs, comprising:

a first bus and tag sub-assembly including:

a first connector for mating with the first interface in the first device, a first multi-line cable assembly having a first end and a second end, the first end connected to the first connector assembly, a first converter adapter connected to the multi-line cable assembly second end, a second connector connected to the converter adapter, the second connector assembly for mating with the second interface in the first device, and the first converter adapter including integrated circuit means for (1) multiplexing and then serializing parallel bus and tag information received from the first and second interfaces in the first device and sending such multiplexed serial information over a first line of the dual line cable assembly to the second computer device and (2) deserializing and then demultiplexing serial bus and tag information received through a second line of the dual line cable assembly and sending such parallel and demultiplexed information to the first and second interfaces of the first device.

The invention is further directed to an apparatus for use in connecting a first computer device and a second computer device through a dual line cable assembly, the first and second computer devices having first and second electrical interfaces having a plurality of rows and columns of bus and tag inputs and outputs, comprising:

a first connector for connecting to the second interface in the first device;

a converter adapter adjacent and connected to the first connector the converter adapter comprising:

a printed circuit board with conductive paths;

one or more second connector connected to some of the conductive paths and for receiving signals from the first interface in the first device;

one or more third connector connecting the first connector and some of the conductive paths;

one or more fourth connector for connecting some of the conductive paths to one or more power sources;

a receiver connector connected to some of the conductive paths and for connecting to a connector on one end of the dual line cable assembly to receive signals over one of the lines in the dual line cable assembly; and a transmitter connector connected to some of the conductive paths and for connecting to the connector on the end of the cable assembly to send signals over the other one of the lines in the dual line cable assembly;

terminator networks connected by some of the paths to the second and third connectors;

line drivers/receivers connected by some of the paths to the terminator networks;

integrated circuit means connected to the line drivers/receivers and for (1) multiplexing and then serializing parallel bus and tag information received from the first and second interfaces in the first device and sending such multiplexed serial information over a first line of the dual line cable assembly and (2) deserializing and then demultiplexing serial bus and tag information received through a second line of the dual line cable assembly from the second computer device and sending such parallel and demultiplexed information to the first and second interfaces of the first device, wherein the integrated circuit means comprises:

an erasable programmable logic device, a nonerasable programmable logic device, or a custom design programmable logic device, the device connected by some of the paths to the line drivers/receivers;

a transmitter section including;

a serializer for receiving a plurality of parallel multiplexed signals from the programmable device over conductive paths, encoding the signals, serializing the signals, converting the signals to emitter coupled logic (ECL) levels and shifting the converted signals out on a conductive path; and an ECL to current translator connected by paths to the serializer and the transmitter connector; and a receiver section including a deserializer for receiving serialized signals and continuously deserializing, decoding and latching parallel data through parallel conductive paths to the programmable device.

BRIEF DESCRIPTION OF THE DRAWINGS

The invention can be more fully understood from the following detailed description thereof in connection with accompanying drawings described as follows.

DESCRIPTION OF THE PREFERRED EMBODIMENT(S)

Figure 1:
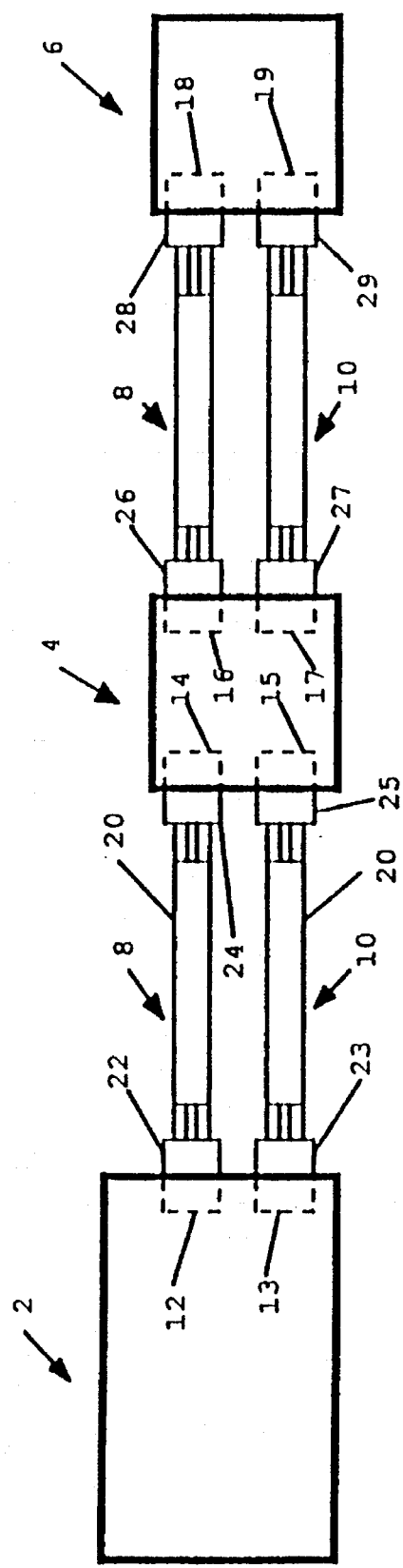
FIG. 1 is a schematic illustration of a mainframe and a pair of peripherals interconnected by conventional electrical assemblies.

Throughout the following detailed description, similar reference characters refer to similar elements in all figures of the drawings.

Figure 2:
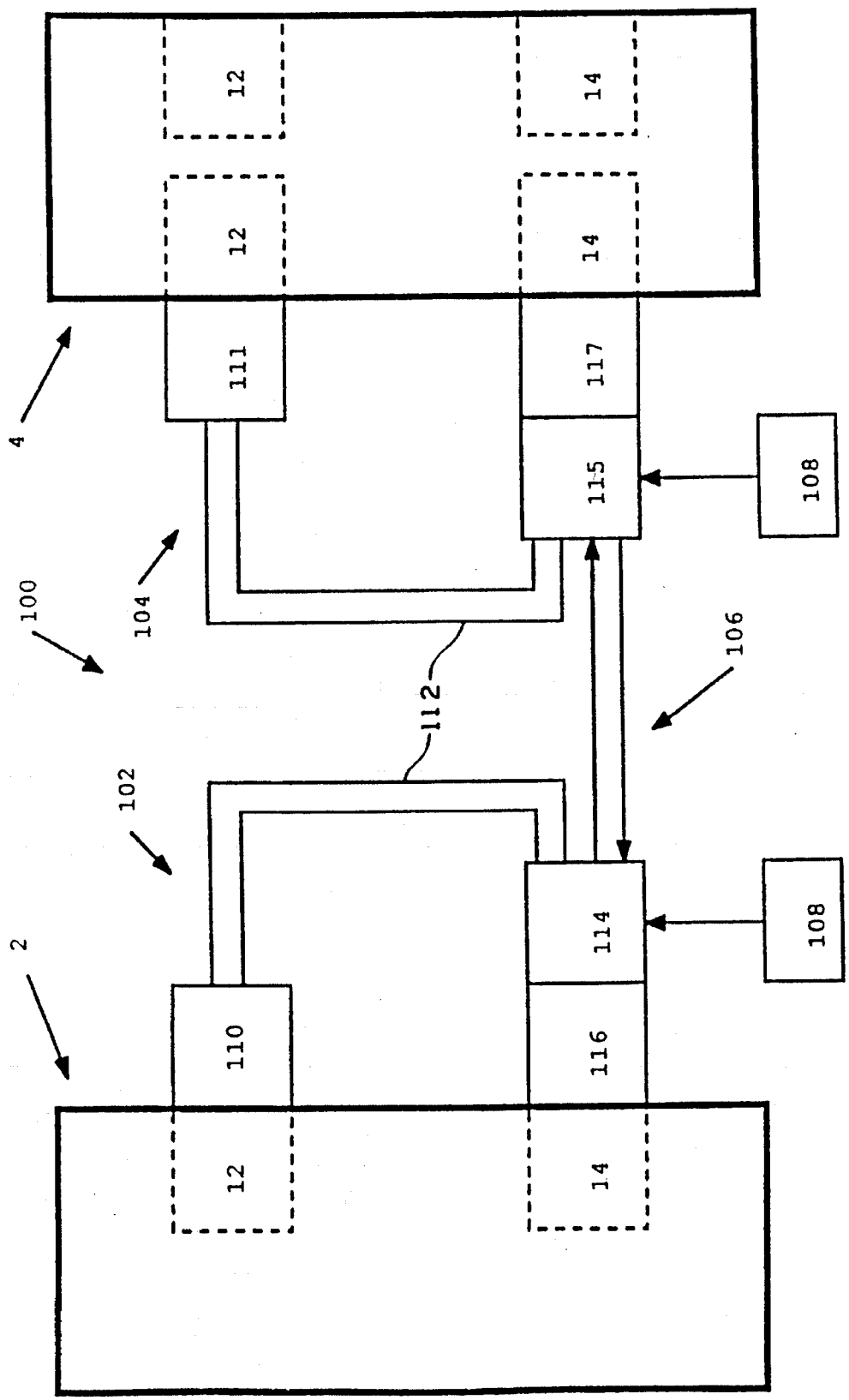
FIG. 2 is a block diagram illustrating a first embodiment of an apparatus for connecting one computer device to another computer device in accordance with the present invention.

Referring to FIG. 2, there is depicted a block diagram illustrating an apparatus 100 for connecting computer devices 2,4 in accordance with the present invention. Either one of the computer devices can be a mainframe, a peripheral, a disk drive, a tape drive, a server, a printer, a channel switch, a fiber optic or electrical cable channel extender, or the like. The apparatus 100 comprises a first, host or local bus and tag sub-assembly 102 and a second or remote bus and tag sub-assembly 104 joined by a dual line cable assembly 106. The bus and tag sub-assemblies 102,104 can be electro-optic or just electronic. If the bus and tag sub-assemblies 102,104 are electro-optic, the cable assembly 106 is a fiber optic cable including two fiber optic lines, such as a duplex fiber optic cable assembly. If the bus and tag sub-assemblies 102,104 are just electronic, the cable assembly 106 is an electrical cable assembly including two lines, such as an electrical coaxial cable or twisted wire pair assembly. Power sources 108 connect with, in order to provide power to, the sub-assemblies 102 and 104.

Figure 3:
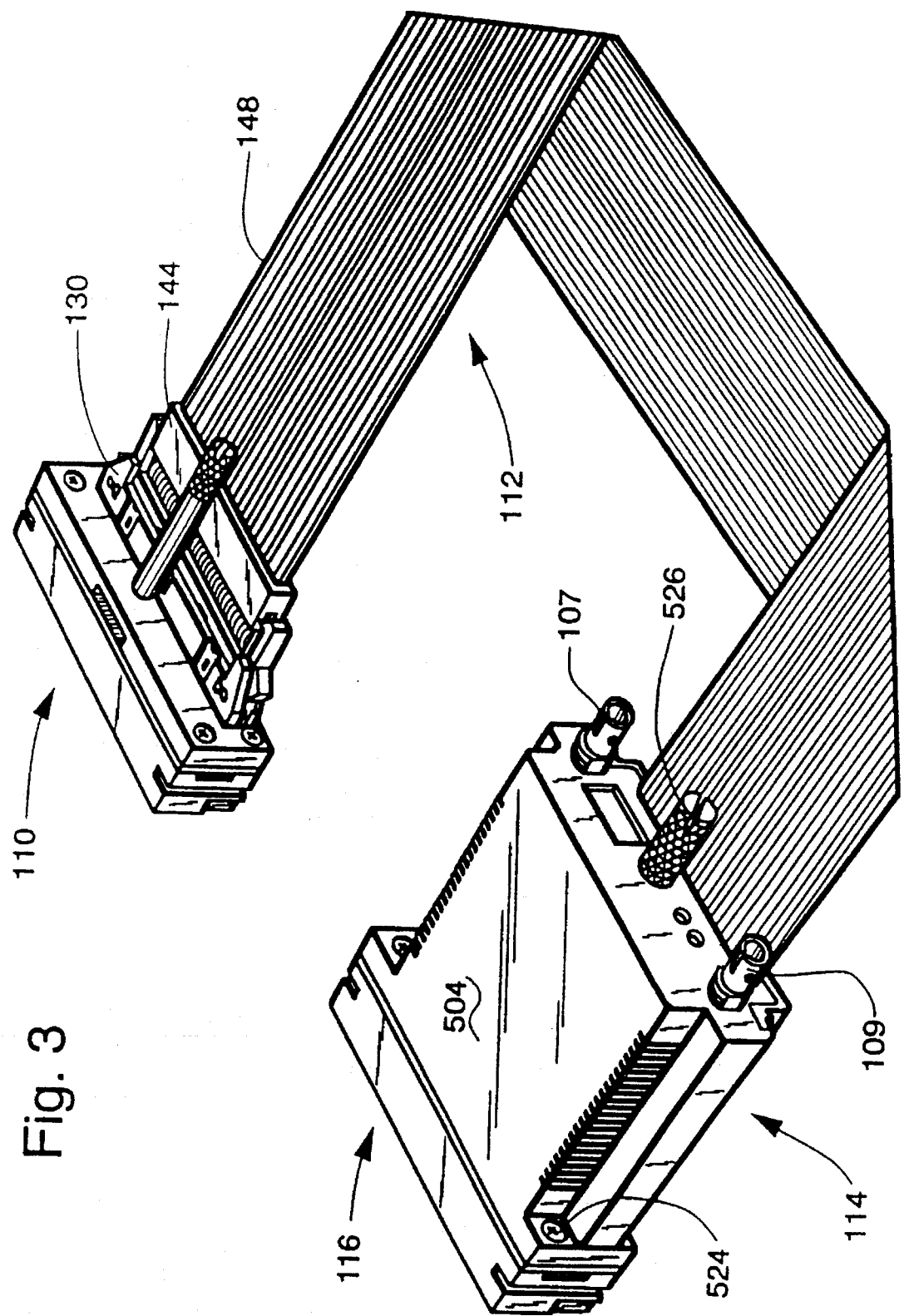
FIG. 3 a perspective view of a bus and tag sub-assembly including a first connector, a cable assembly, a converter assembly and a second connector in accordance with the present invention.

Referring to FIGS. 2 and 3, each one of the bus and tag sub-assemblies 102,104 comprises a first connector 110,111, a multi-line electrical cable assembly 112 connected at a first end to the first connector 110,111, a converter adapter 114,115 connected to a second end of the cable assembly 112 and a second connector 116,117 connected to the converter adapter 114,115. The first and second connectors 110,116 in the first or host bus and tag sub-assembly 102 are adapted to connect to the connectors or adapters 12 and 14 in the first computer device or mainframe 2. The first and second connectors 111,117 in the second or remote bus and tag sub-assembly 104 connect to the connectors or adapters 12 and 14 in the second computer device or peripheral 4. The converter adapters 114,115 are adapted to connect to power sources 108. More specifically, power for active electronics in the converter adapters 114,115 can be supplied externally through power connectors on the converter adapters 114,115 to external power supplies 108 or through unused terminals within the one of the connectors 110,111 or 116,117 to power supplies within the computer device 2,4.

Figure 4:
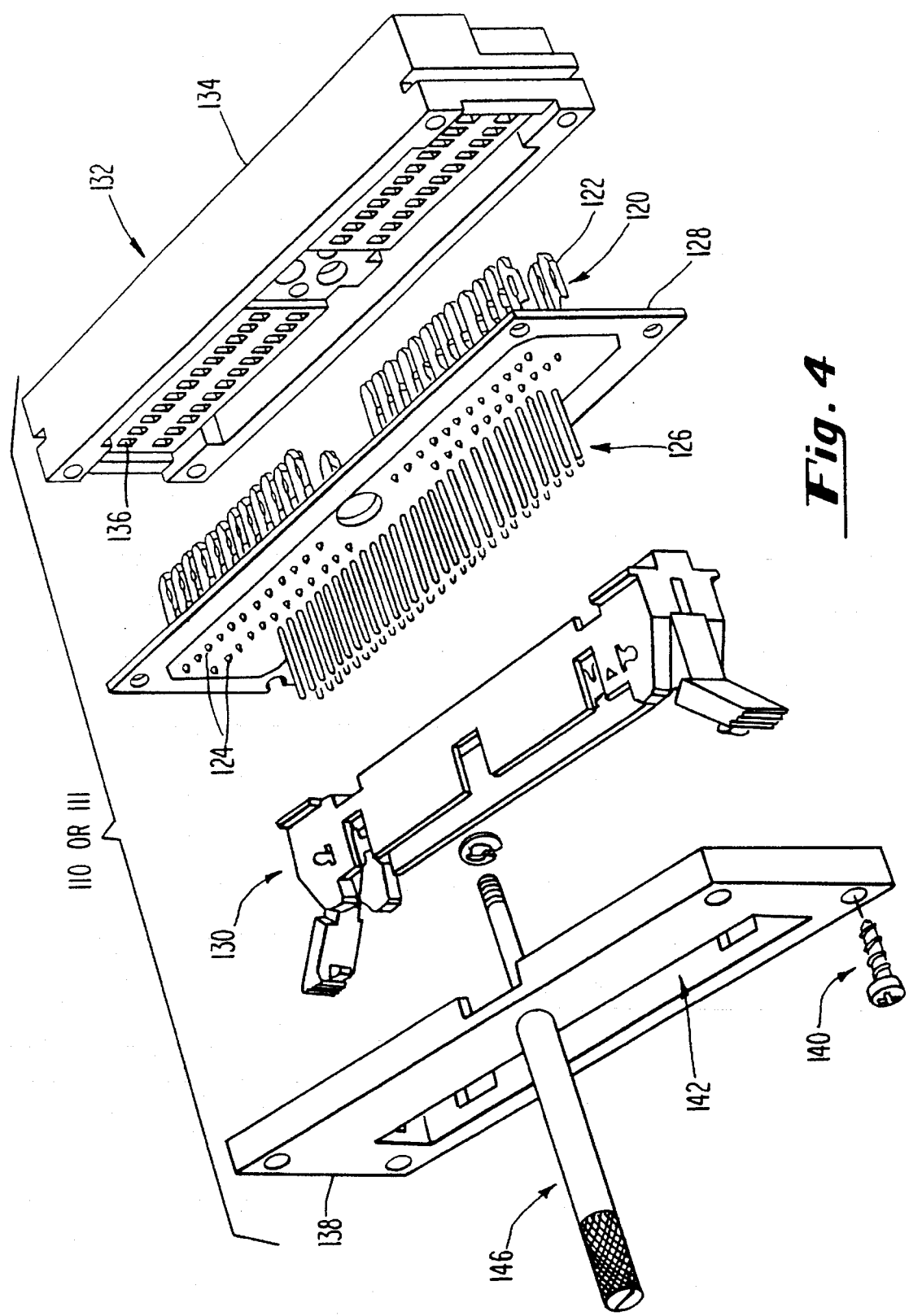
FIG. 4 is a perspective view of the first connector in accordance with the present invention with parts exploded from one another.

Referring to FIG. 4, each one of the first connectors 110,111 is preferably an adapter which converts a first or external wiring/terminal connection scheme, grid or geometry to a second or internal wiring/terminal scheme, grid or geometry. Each adapter 110,111 preferably has a first plurality of terminals 120 having first serpent contacts or end portions 122 and second solder tail or press fit shaped contacts or end portions 124. The first terminals 120 are preferably arranged in a first grid pattern comprising two groups, each with two rows and twelve columns. Each input/output connector assembly 110,111 preferably further comprises a second plurality of pin shaped terminals 126 having first contacts or end portions and second contacts or end portions. The second terminals 126 are preferably arranged in a second grid pattern comprising one group of two rows and twenty-five columns. Two of the second terminals 126 can be connected to ground. The first terminals 120 are preferably spaced 0.125 inches apart from center to center of adjacent terminals in the columns and 0.250 inches apart from center to center of terminals in different rows. The second terminals 126 are preferably spaced 0.100 inches apart from center to center of adjacent terminals in the columns and 0.100 inches apart from center to center of terminals in different rows. The input/output adapter assembly 110,111 preferably further comprises means 128 for electrically interconnecting the second contacts of the first and second terminals 120,126. Preferably, the interconnecting means 128 is a printed circuit board or the like. The interconnecting means 128 can be different for each one of the adapters 110 and 111. Preferably, they are different in that the conductive paths in the circuit boards are arranged to interconnect the first and second terminals 120,126 in the adapters 110 and 111 as required in IBM Publication GA22-6974-09. Each adapter 110,111 preferably further includes an insulative shroud or header 130 for receiving the second plurality of terminals 126 and mating with the cable assembly 112. The header 130 can be a quick eject header commercially available under part no. 65863 from E. I. du Pont de Nemours and Company, hereafter "Du Pont", with offices at Wilmington, Del. Each adapter 110,111 further includes an insulative housing 132. Preferably, the housing 132 includes a first housing part 134 with passages 136 for receiving the first plurality of terminals 120 for mating with the connector 12,14 in the first computer device 2 or the second computer device 4, respectively. Preferably, the housing 132 includes a second housing part 138 attached to the printed circuit board 128 and the first housing part 134 with fasteners 140, such as screws. The second housing part 138 has a slot 142 through which the shroud 130 extends for mating with a connector 144 terminating one end of the cable assembly 112. A jack screw assembly 146 can extend through the adapter 110,111 for use in securing the adapter 110,111 to the mainframe 2 or peripheral 4. Preferred adapters for use as the adapters 110 and 111 in the present invention are described in U.S. Pat. No. 4,585,284 and are commercially available under part nos. 69477-006 and 69477-005 from Du Pont.

Figure 7:
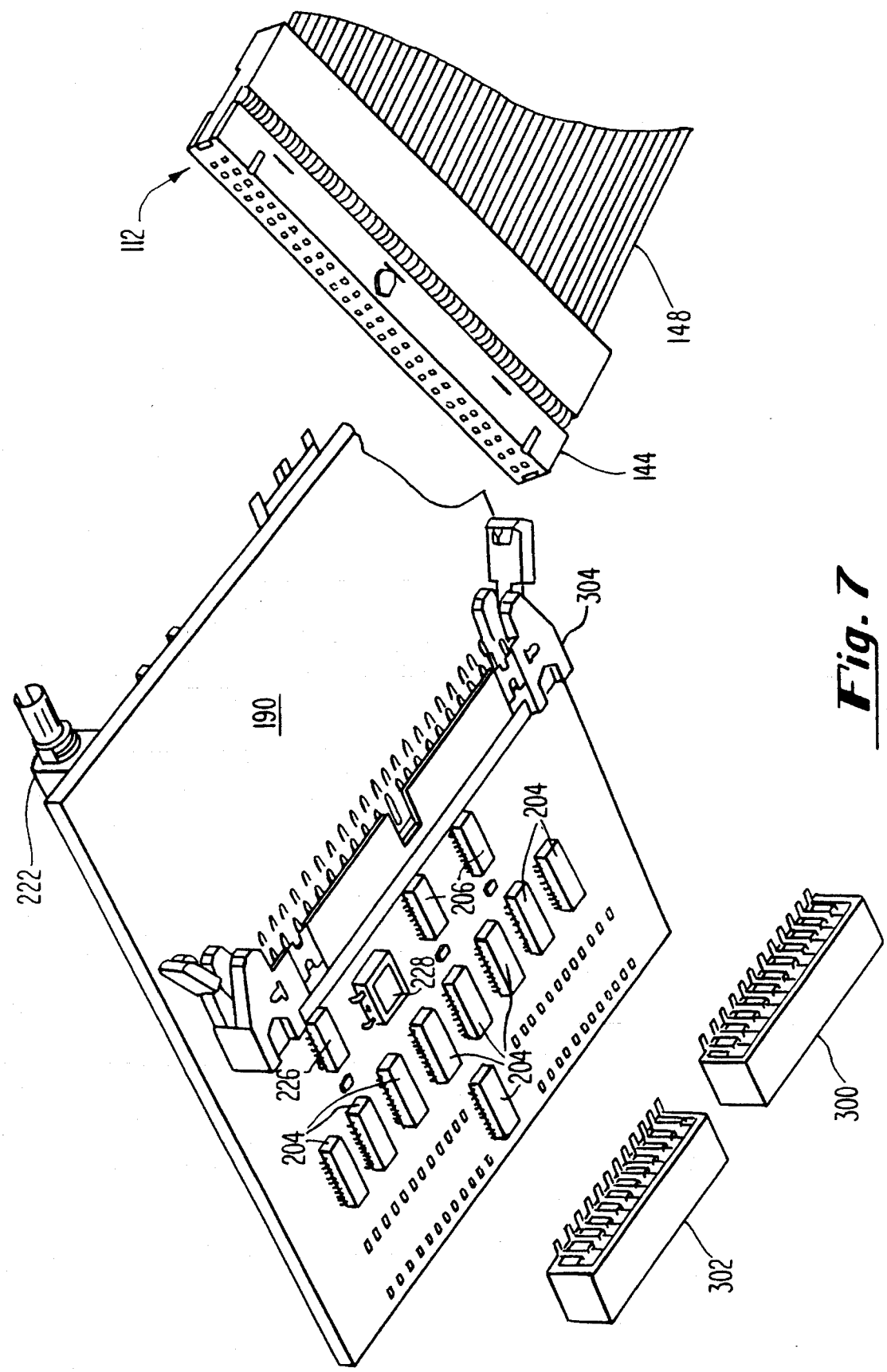
FIG. 7 is a perspective view of a first side of the converter adapter with its housing removed in accordance with the present invention with parts exploded from one another.

Referring to FIGS. 3 and 7, preferably, the multi-line cable assembly 112 comprises a generally flat and flexible electrical transmission line cable 148 with a plurality of insulated conductors terminated by connectors 144 on each end of the cable 148. The connectors 144 are preferably receptacles. A suitable cable assembly that can be used as the cable assembly 112 is commercially available under part no. 92642-001 from Du Pont.

Figure 5:
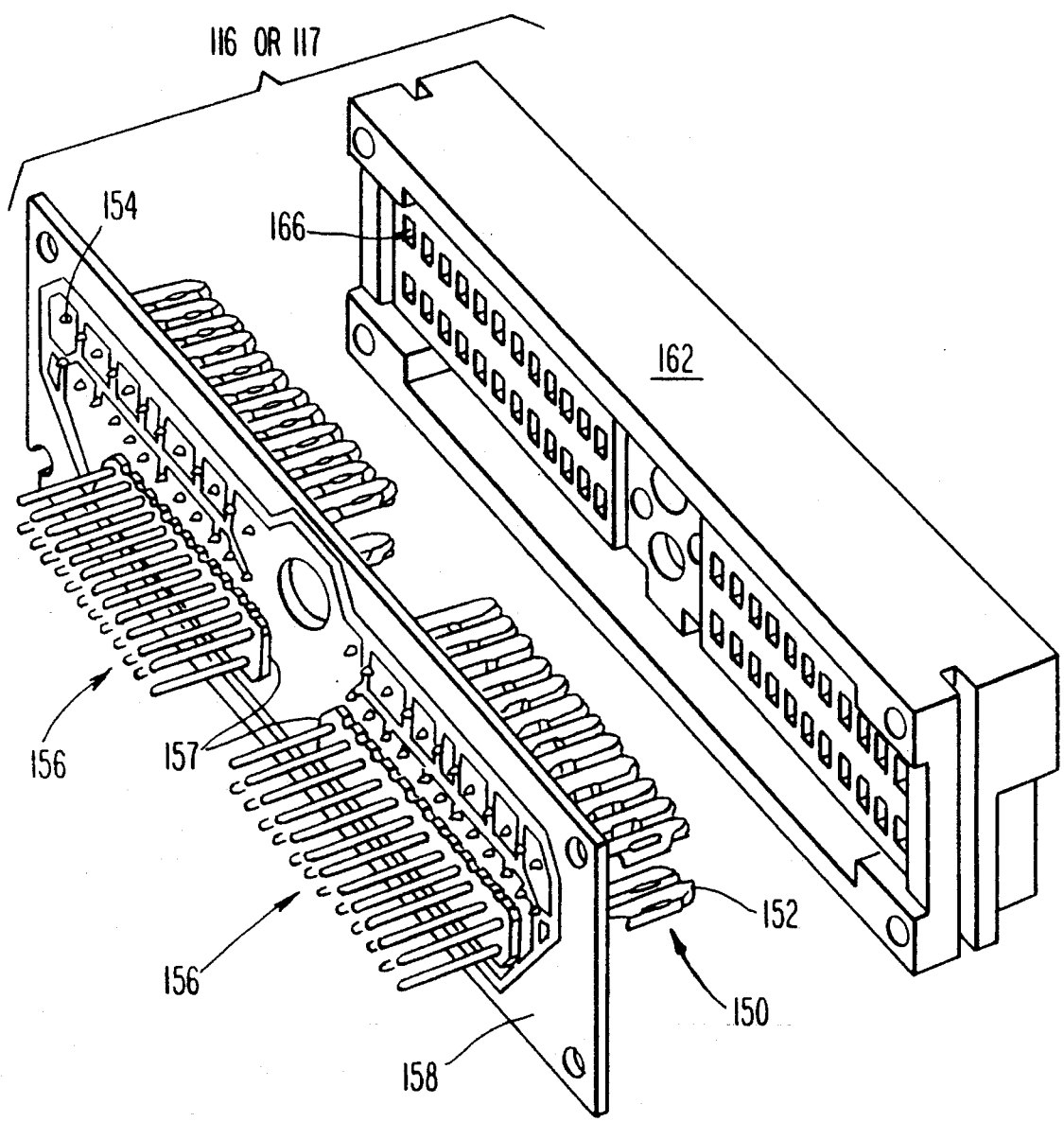
FIG. 5 is a perspective view of the second connector in accordance with the present invention with parts exploded from one another.

Referring to FIG. 5, each one of the first connectors 116,117 is also preferably an adapter which converts an external wiring/terminal connection scheme, grid or geometry to an internal wiring/terminal scheme, grid or geometry. Each adapter 116,117 preferably has a first plurality of terminals 150 having first serpent contacts or end portions 152 and second solder tail or press fit shaped contacts or end portions 154. The first terminals 150 are preferably arranged in a grid pattern comprising two groups, each with two rows and twelve columns. Each input/output connector assembly 116,117 preferably further comprises a second plurality of pin shaped terminals 156 having first contacts or end portions and second contacts or end portions. The second terminals 156 are preferably arranged in a second grid pattern comprising two groups of two rows and thirteen columns. Each of the two group of the second terminals 156 preferably are stacked in an insulative support 157. The first terminals 150 are preferably spaced 0.125 inches apart from center to center of adjacent terminals in the columns and 0.250 inches apart from center to center of terminals in different rows. The second terminals 156 are preferably spaced 0.100 inches apart from center to center of adjacent terminals in the columns and 0.100 inches apart from center to center of terminals in different rows. The input/output adapter assembly 116,116 preferably further comprises means 158 for electrically interconnecting the second contacts of the first and second terminals 150,156. Preferably, the interconnecting means 158 is a printed circuit board or the like. The interconnecting means 158 can be different for each one of the adapters 116 and 117. Preferably, they are different in that the conductive paths in the circuit boards are arranged to interconnect the first and second terminals 150,156 in the adapters 116 and 117 as required in IBM Publication GA22-6974-09. Each adapter 116,117 further includes an insulative housing 162. The housing 162 includes passages 166 for receiving the first plurality of terminals 150 for mating with the connector 12,14 in the first device 2 or second device 4, respectively. Preferred adapters for use as the adapters 116 and 117 in the present invention are described in U.S. Pat. No. 4,585,284. Preferred adapters 116 and 117 are parts of assemblies commercially available under part nos. 92643-001 (dark) and 92644-001 (light) from Du Pont.

Figure 6:
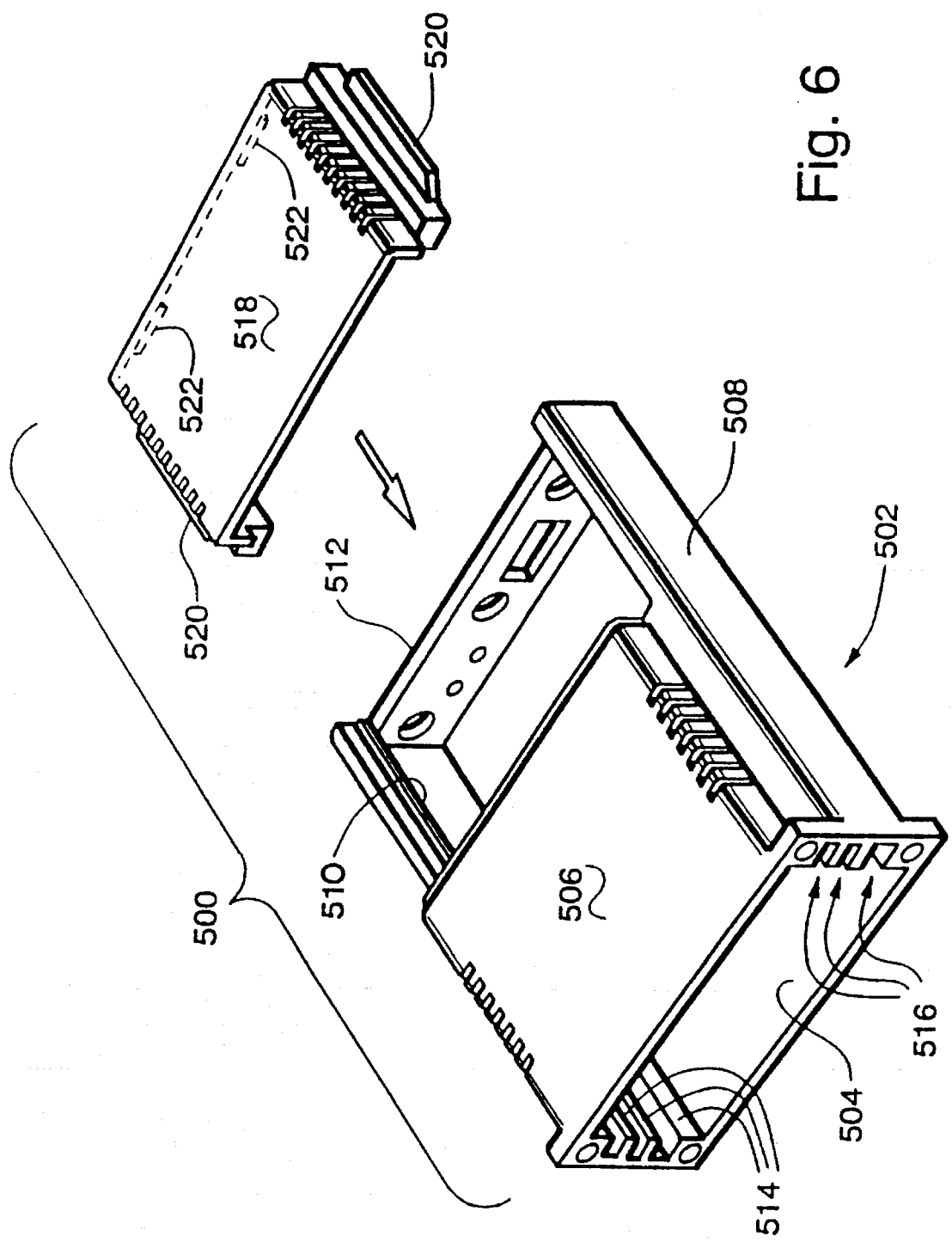
FIG. 6 is a perspective view of a housing for the converter adapter in accordance with the present invention.

FIG. 6 is a perspective view of a housing 500 for the converter adapter 114,115. The housing 500 has a main rectangularly shaped frame 502 with a first top wall 504, a second bottom wall 506, a third side wall 508, a fourth side wall 510 and a fifth end wall 512. The side walls are parallel and spaced from one another and have internal longitudinal rails or ridges 514 defining grooves 516 between a pair of the rails or ridges 514. Edges of circuit board 190 slide in the grooves 516 such that the adjacent rails or ridges 514 hold the circuit board 190 in place in the housing 500. The housing 500 includes a cover 518 with ribs 520 that slide in grooves 516 defined by a pair of the rails or ridges 514. The cover 518 also has projections 522 that snap over an edge of the end side 512 of the frame 502 to secure the cover 518 on the frame 502. The housing 500 can be made of a conductive material (e.g., aluminum) or an insulative material (e.g., plastic). If the housing is made of plastic, it can be coated with a metallized or conductive layer. Alternatively, a conductive or metallized sheet can be slid in grooves 515 adjacent the top wall 504 and/or the bottom wall 506 to enhance electrical performance. After the printed circuit board 190 is inserted in the housing 500, the housing 500 is secured to the second connector printed circuit board 158 and the second connector housing 162, such as, by screws 524. A jack screw assembly 526 (such as the assembly commercially available from Du Pont under part number 92645-001) can extend through the housing 500 and the adapter 116,117 for use in securing the converter adapter 114 combined with the adapter 116,117 to the mainframe 2 or peripheral 4. The connector 116,117 connected to the converter adapter 114,115 can be contained within a box approximately 1 inch (2.54 centimeters) by 4 inches (10.16 centimeters) by 4.5 inches (11.43 centimeters).

Figure 8:
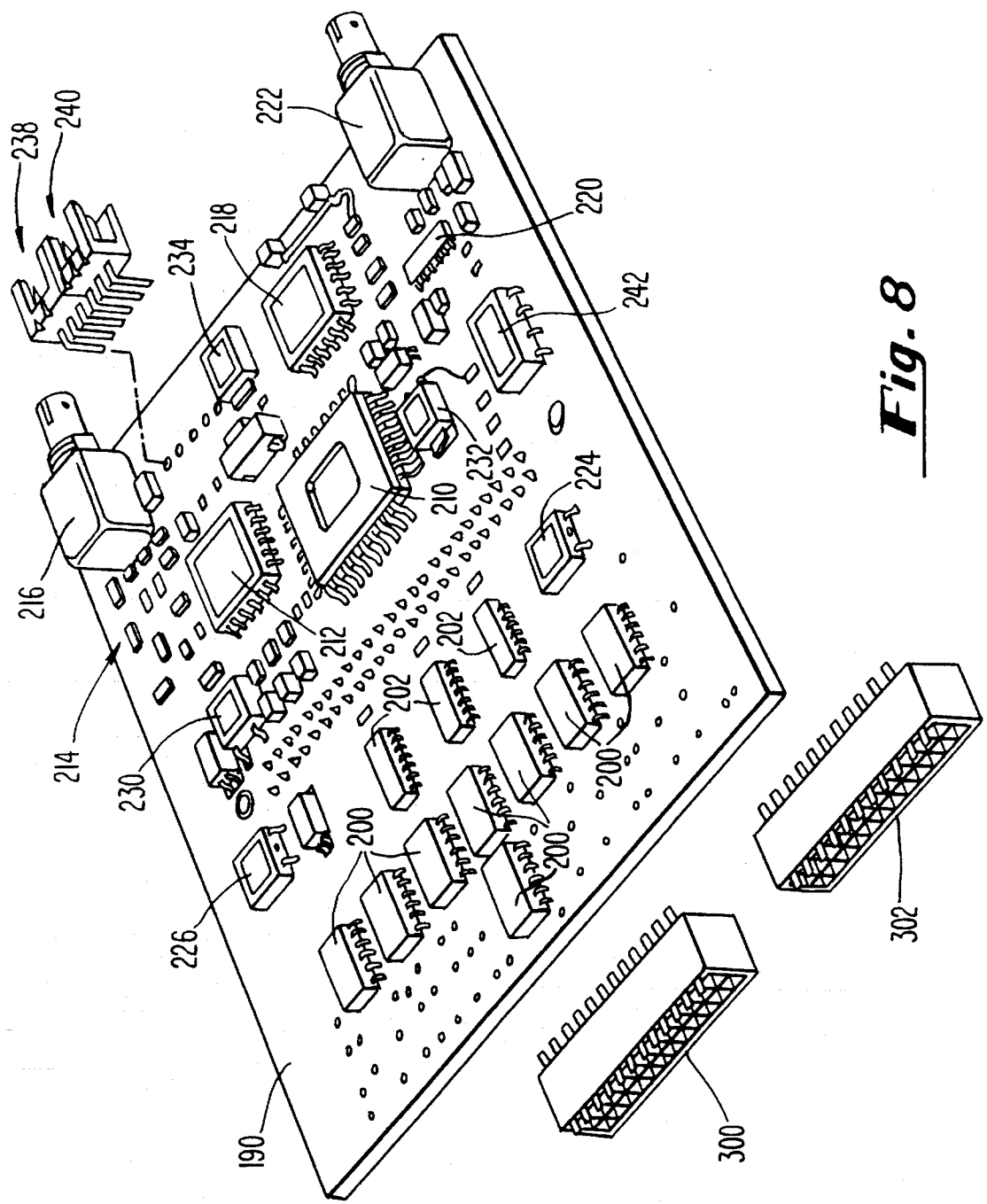
FIG. 8 is a perspective view of a second side of the converter adapter with its housing removed in accordance with the present invention with parts exploded from one another.

FIG. 7 is a perspective view of a first side of the converter adapter 114,115 with the housing 500 removed with parts exploded from one another. FIG. 8 is a perspective view of a second side of the converter adapter 114,115 with the housing 500 removed with parts exploded from one another. The converter adapter 114,115 comprises a circuit board 190 with conductive traces, paths or lines, a plurality of connectors 216, 222, 238, 240, 300, 302, and 304 electrically interconnecting the traces with parts off the board 190, and other components electrically connected to the traces. The connector 304 is for mating with the connector 144 on one end of the cable assembly 112. The connector 304 can be a right angle sea horse or quick eject header, such as commercially available under part number 78278 from Du Pont. The pair of connectors 300 and 302 are for receiving the two groups of the second terminals 156. The connectors 300 and 302 can be surface mount horizontal card connectors, such as commercially available under part number 67848-013 from Du Pont. One or more connector 238,240 is for connection to one or redundant power sources 108. The connectors 238 and 240 can be 1 by 3 right angle friction latch headers, such as commercially available under part number 78208-013 from Du Pont. The receiver connector 222 is for connecting to a connector on one end of the cable assembly 106 to receive signals over one of the fiber optic or electrical lines in the cable assembly 106. The transmitter connector 216 is for connecting to the connector on the end of the cable assembly 106 to send signals over the other one of the fiber optic or electrical lines in the cable assembly 106. If the converter adapter 114,115 is an electro-optic adapter, then the transmitter connector 216 can be a light emitting diode (LED) device commercially available under part number HFBR 1414T and the receiver connector 222 can be a positive intrinsic negative (PIN) photodetector and amplifier assembly under part number HFBR 2416TC, both from Hewlett Packard with offices in San Jose, Calif.

Figure 9:
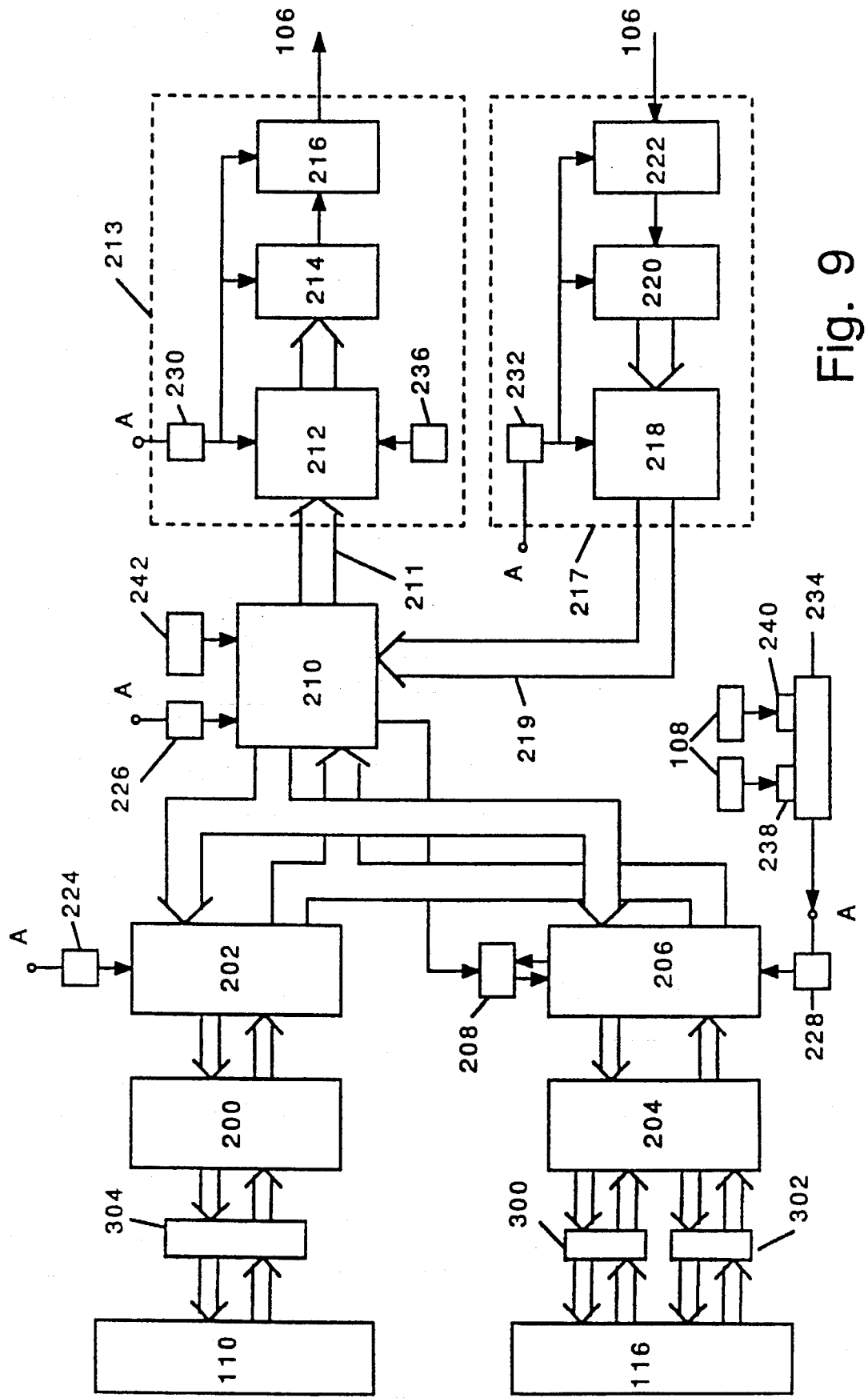
FIG. 9 is a block diagram of a converter circuit in the the converter adapter in accordance with the present invention.

FIG. 9 is an architectural or structural block diagram of the converter adapter 114,115 schematically showing the connectors 216, 222, 238, 240, 300, 302, and 304, and other components in the converter adapter 114,115. Bus IN lines and Bus OUT lines pass through the connector 304 and board conductive traces to terminator networks 200 comprising resistor circuits which terminate the lines to their characteristic impedance. Similarly, tag IN lines and tag OUT lines pass through the connectors 300,302 and board traces to terminator networks 204 comprising resistor circuits which similarly terminate the lines. Resistor circuits commercially available under part no. 628A470G from Beckman Co. with offices in Fullerton, Calif., can be used for the terminator networks 200,204.

The terminator networks 200,204 are connected by board traces to line drivers/receivers 202,206 which receive and convert (1) IBM Original Equipment Manufacturers' Information (OEMI) compatible voltage levels to transistor to transistor levels (TTL) compatible voltage levels from left to right in FIG. 9 or (2) from TTL compatible voltage levels to IBM OEMI compatible voltage levels from right to left in FIG. 9. Suitable drivers/receivers that can be used for drivers/receivers 202,206 are commercially available under part no. SN751730D from Texas Instruments with office in Dallas, Tex.

A relay 208 is provided to terminate or propagate a SELECT-OUT transmission tag line in the converter adapter 114. If the converter adapter 114 is powered up by a power source 108 and connected to the adapter 115 through the cable assembly 106, the relay 208 terminates the SELECT-OUT transmission tag line. If the converter adapter 114 is not powered up by power source 108 and/or if connection is not established with the adapter 115, the relay 208 propagates the SELECT-OUT transmission tag line to the SELECT-IN transmission tag line. The converter adapter 115 does not contain a corresponding relay 208.

The drivers/receivers 202,206 are connected by board traces to means 210 for multiplexing signals received from the receivers 202,206 and demultiplexing signals sent to the drivers 202,206. The multiplexing and demultiplexing means 210 combines Bus signals and Tag signals onto a bus 211 having a plurality of lines (e.g., 10). The multiplexing and demultiplexing means 210 also separates Bus signals and Tag signals from a bus 219 having a plurality of lines (e.g., 10). This multiplexing synchronizes the Bus and Tag signals through a master clock generated by an onboard oscillator. Strobe and acknowledge signalling provides this synchronization by registering the 10 bit bus into an input latch. The data in the input latch is then passed over bus 211.

The multiplexing and demultiplexing means 210 further includes means for emulating TAG signals to reduce system and cable induced delays. The multiplexing and demultiplexing means 210 can be a programmed erasable programmable logic device (EPLD), such as the EPLD commercially available under part no. EPM5130-WC-1 from Altera Corp. with offices in San Jose, Calif. The EPLD can be programmed accordingly to follow the protocols defined by IBM Publication GA22-6974-09 with the following exceptions. The converter adapter 114 does not propagate reserved lines or special-use lines, except the J09 signal line, to the converter adapter 115. When the channel raises 'service out' ('data out') during dc-interlocked data transfer, the adapter 114 drops 'service in' ('data in'). This may occur before the control unit has recognized the rise of 'service out' ('data out'). After the control unit recognizes the rise of 'service out' ('data out'), it drops 'service in' ('data in') and the adapter 115 drops 'service out' ('data out'). This may occur before the channel has recognized the fall of 'service in' ('data in'). When the adapter 115 recognizes the rise of 'operational in' during initial selection for DASD, it drops 'address out'. When the adapter 115 recognizes the fall of 'status in' during initial selection for DASD and the current command is being chained from a previous command, it drops 'service out'. This may occur before the channel has recognized the fall of 'status in'.

Two report files generated by a Max+Plus II Compiler for an EPM5130WC-1 chip from Altera Corp. are included in Appendices A and B to this specification and appear immediately before the claims. The report files in Appendices A and B show how embodiments of the EPLD 210 in each one of the adapters 114 and 115, respectively, can be implemented. These report files are sufficient information for one of ordinary skill in the art to reproduce the designs of these embodiments.

Alternatively, the multiplexing and demultiplexing means 210 can include a nonerasable programmable logic device (PLD) or a custom design programmable logic device, such as an application specific Integrated circuit (ASIC). If an ASIC is used, it can be designed to perform other functions than those included in the EPLD. For instance, such other functions can include the functions performed by any or all other components on the printed circuit board 190. Such alternatives are equivalent to the embodiments disclosed in more detail using the EPLD. The structure for performing the functions performed by any or all components on the printed circuit board 190 can be referred to as integrated circuit means.

The integrated circuit means can include a transmitter section 213 and a receiver section 217.

The bus 211 of parallel traces connects the programmed EPLD 210 to a serializer 212 within the transmitter section 213. The serializer 212 converts parallel data to serial data. More specifically, the serializer 212 receives a plurality of parallel multiplexed signals from the 10-bit bus 211 and sends it to an encoder latch to convert the 10-bit bus to a 12-bit encoded word. This encoding is used to maximize bit boundary transitions to help balance the data pattern and aid in the timing recovery on the receiving side. The 12-bit word is then fed to a shift register where the contents are serially shifted out in a single stream on one line. The serializer 212 can be a transparent asynchronous transmitter-receiver interface (TAXI) commercially available under part no. AM-7968 from Advanced Micro Devices with offices in Sunnyvale, Calif. A quartz crystal oscillator and clock generator 236 can provide a fixed clock frequency to the serializer 212. In summary, the serializer 212 encodes the data, serializes it, converts the data to emitter coupled logic (ECL) levels (which are voltage signals), and shifts the data out over balanced lines. This data is fed to an ECL to current translator 214 which feeds current pulses to the transmitter connector 216 which can contain a light emitting diode device. The transmitter connector 216 connects to the connector on the end of the cable assembly 106 to send optical data pulses over one line of the fiber optic lines in the cable assembly 106. Alternatively, current data pulses from the ECL to current translator 214 are fed through an electrical transmitter connector and an electrical line of the electrical cable assembly 106.

Signals or data pulses are transmitted over another line of the cable assembly 106 and received by the receiver section 217. If the cable assembly 106 is fiber optic, the receiver section 217 includes the receiver connector 222 which can be a photodiode and preamplifier which converts groups of photons or optical light pulses to an analog voltage output. The photodiode and preamplifier 222 can be a positive intrinsic negative (PIN) photodiode and preamplifier, such as, commercially available under part no. HFBR2614TC from Hewlett Packard. The output from the photodiode and preamplifier 222 is fed into a data quantizer 220 which amplifies and converts the voltage signals to a constant level output that is ECL compatible. The data quantizer 220 also provides a status indication or a loss of signal to the EPLD 210 indicating whether there is a connection at the distal end of the cable assembly 106. The data quantizer 220 can be part no. NE5224 commercially available from Signetics with offices in Sunnyvale, Calif. The output of the data quantizer 220 is fed into a deserializer 218 which receives and the serialized ECL levels and continuously deserializes, decodes and latches parallel data through the 10 bit parallel bus 219 to the EPLD 210. The deserializer 218 can be part no. AM7969 commercially available from Advanced Micro Devices.

One or more voltage regulator 224,226,228,230,232 can be connected to provide a constant voltage supply to the line drivers/receivers 202,206, the EPLD 210, the serializer 212 and the deserializer 218. The voltage regulators can be connected to a power input circuit 234 which can be "OR" connected to redundant power supplies 108. Thus, if the primary power supply 108 fails, power is automatically supplied from a second power supply 108.

Thus, data inputted to the bus and tag sub-assembly 102 from the bus and tag interfaces 12 and 14 is transmitted over the dual line cable assembly 106 and the bus and tag sub-assembly 104 and appears at the receiving device interfaces 12 and 14 exactly duplicated, only delayed in the time domain by the serialization and deserialization function and the propagation delay of the pulses in the lines which is length dependent (approximately 5 microseconds for each kilometer of optical fiber).

Figure 10:
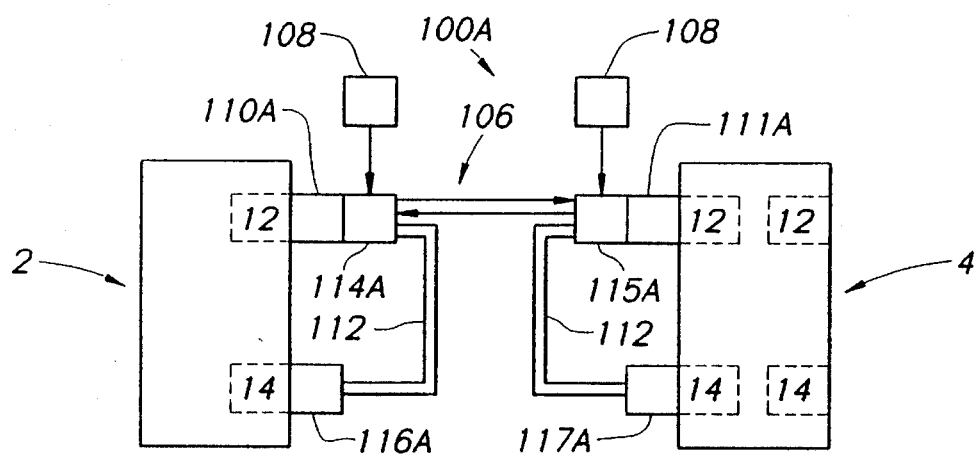
FIGS. 10–12 are block diagrams illustrating second, third and fourth embodiments of apparatus for connecting one computer device to another computer device in accordance with the present invention.
Figure 11:
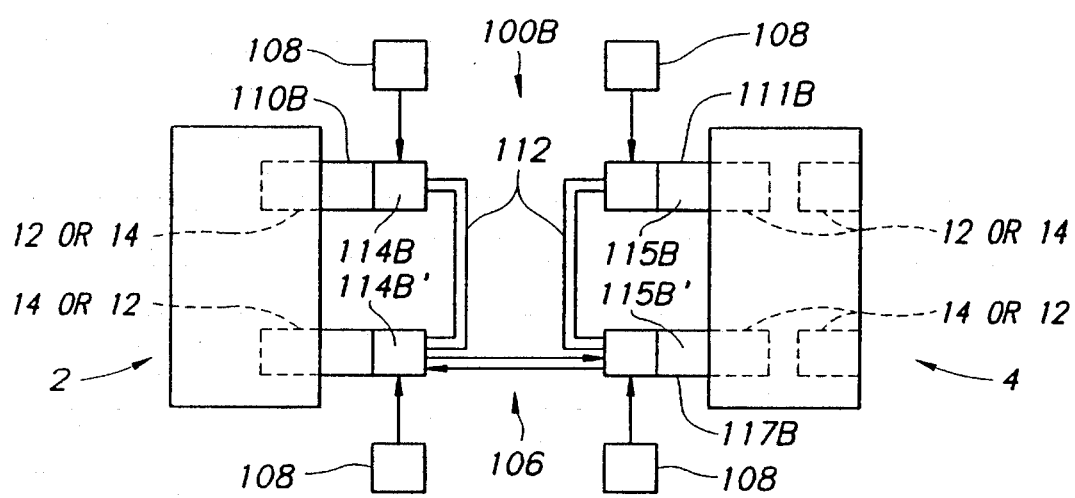
Figure 12:
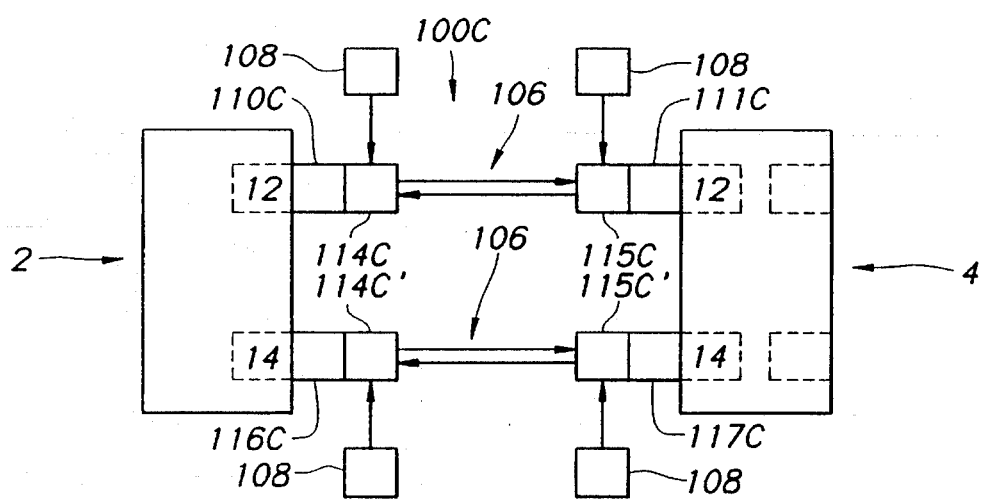

FIGS. 10–12 are block diagrams illustrating second, third and fourth embodiments of apparatus 100A, 100B and 100C for connecting one computer device 2 to another computer device 4 in accordance with the present invention. FIG. 10 illustrates the apparatus 100A similar to the apparatus 100 illustrated in FIG. 2, except the converter adapters 114A, 115A are connected directly to the connectors 110A, 111A connected to bus interfaces 12, rather than to the connectors 116A, 117A connected to the tag interfaces 14.

FIG. 11 illustrates an apparatus 100B similar to the apparatus 100 illustrated in FIG. 2, except the functions performed by the converter adapters 114 and 115 in FIG. 2 are now performed by converter adapters 114B, 114B', 115B and 115B' which are connected directly to the connectors 110B, 116B, 111B and 117B, respectively. One of the cable assemblies 112 interconnects adapters 114B and 114B'. Another one of the cable assemblies 112 interconnects adapters 115B and 115B'. Each pair of the converter adapters 114B,114B' and 115B,115B' include integrated circuit means similar to the one previously described in detail in relation to the embodiment illustrated in FIG. 9, but with parts located in two housings rather than one. In the embodiment depicted in FIG. 11, the integrated circuit means in converter adapters 114B,114B' is for (1) multiplexing and then serializing parallel bus and tag information received from the first and second interfaces 12,14 in the first device 2 and sending such multiplexed serial information over a first line of the dual line cable assembly 106 to the second computer device 4 and (2) deserializing and then demultiplexing serial bus and tag information received through a second line of the dual line cable assembly 106 and sending such parallel and demultiplexed information to the first and second interfaces 12,14 of the first device 2. In other words, the result achieved by converter adapter 114 in FIG. 2 is achieved by converter adapters 114B and 114B' in FIG. 11. Similarly, the result achieved by converter adapter 115 in FIG. 2 is achieved by converter adapters 115B and 115B' in FIG. 11.

FIG. 12 illustrates the apparatus 100C similar to the apparatus 100 illustrated in FIG. 2, except a converter adapter 114C, 114C', 115C, 115C' is attached to each of the four connectors 110C, 114C, 111C, 117C connected to the interfaces 12,14 of the devices 2,4. This is like the apparatus 100B in FIG. 11 in that each pair of the converter adapters 114C, 114C' and 115C, 115C' include integrated circuit means similar to the one previously described in detail in relation to the embodiment illustrated in FIG. 9, but with parts located in two housings rather than one. Further, a dual line cable assembly 106 interconnects both bus converter adapters 114C, 115C and a dual line cable assembly 106 interconnects both tag converter adapters 114C', 115C'. In the embodiment depicted in FIG. 12, the integrated circuit means in converter adapters 114C, 114C' is for (1) multiplexing and then serializing parallel bus and tag information received from the first and second interfaces 12,14 in the first device 2 and sending such multiplexed serial information over lines of the dual line cable assemblies 106 to the second computer device 4 and (2) deserializing and then demultiplexing serial bus and tag information received through other lines of the dual line cable assemblies 106 and sending such parallel and demultiplexed information to the first and second interfaces 12,14 of the first device 2. In other words, the result achieved by converter adapter 114 in FIG. 2 is achieved by converter adapters 114C and 114C' in FIG. 12. Similarly, the result achieved by converter adapter 115 in FIG. 2 is achieved by converter adapters 115C and 115C' in FIG. 12.

Each one of apparatuses 100A, 100B and 100C are defined as equivalent in function and structure to, and obtain the same result as, the apparatus 100.

The apparatus 100, 100A, 100B, 100C of the present invention can also interconnect daisy-chained peripheral control units on one mainframe multiplexer channel.

The apparatus of the present invention provides up to 4.5 million bytes per second of data throughput between the mainframe and peripherals. It also allows distances up to 2,000 meters (6600 feet) between devices—mainframe to peripheral, and/or peripheral to peripheral.

These features allow a user to replace bulky, limited distance bus and tag cables with dual line fiber optic or electrical cables in a structured wiring scheme. Data transmission via fiber optic cables provides significant advantages over data transmission via conventional copper conductor (bus and tag) cables. There is less bulk and weight. They eliminate the need for raised computer room flooring, except potentially for cooling purposes. There is no electromagnetic or radio frequency interference with signals transmitted through fiber optic cables. There is greater data integrity and security since fiber optic cables are not easily tapped or monitored. Finally, the transmission distance is greater—up to 6600 feet versus 400 feet for conventional bus and tag cables. Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. An apparatus for use in connecting a first computer device and a second computer device through a dual line cable assembly, the first and second computer devices each having first and second electrical interfaces having a plurality of rows and columns of bus and tag inputs and outputs, comprising:

a first bus and tag sub-assembly including:

a first connector for mating with the first interface in the first device, a first multi-line cable assembly having a first end and a second end, the first end connected to the first connector, a first converter adapter connected to the second end of the first multi-line cable assembly and being adapted for connection to the dual line cable assembly, a second connector connected to the first converter adapter and being mated with the second interface in the first device, and the first converter adapter including integrated circuit means for (1) multiplexing and then serializing parallel bus and tag information received from the first and second interfaces in the first device and sending such multiplexed serial information over a first line of the dual line cable assembly to the second computer device and (2) deserializing and then demultiplexing serial bus and tag information received through a second line of the dual line cable assembly and sending such parallel and demultiplexed information to the first and second interfaces of the first device.

2. The apparatus of claim 1, wherein the dual line cable assembly has a first end and a second end, said first end of the dual line cable assembly connected to the first converter adapter, the apparatus further comprising:

a second bus and tag sub-assembly including:

a third connector for mating with the first interface in the second device, a second multi-line cable assembly having a first end and a second end, the first end connected to the third connector, a second converter adapter connected to the second end of the second multi-line cable assembly and to the second end of the dual line cable assembly, a fourth connector connected to the second converter adapter and being mated with the second interface in the second device, and the second converter adapter including integrated circuit means for (1) multiplexing and then serializing parallel bus and tag information received from the first and second interfaces in the second device and sending such multiplexed serial information over the second line of the dual line cable assembly and (2) deserializing and then demultiplexing serial bus and tag information received through the first line of the dual line cable assembly and sending such parallel and demultiplexed information to the first and second interfaces of the second device.

3. The apparatus of claim 2, wherein the bus and tag sub-assemblies are electo-optic and the dual line cable assembly is a fiber optic cable assembly.

4. The apparatus of claim 2, wherein the dual line cable assembly is an electrical cable assembly.

5. The apparatus of claim 2, wherein the first, the second, the third and/or the fourth connectors are bus or tag adapters which convert a first or external wiring/terminal connection scheme, grid or geometry to a second or internal wiring/terminal scheme, grid or geometry.

6. The apparatus of claim 1, wherein the bus and tag sub-assembly is electo-optic.

7. The apparatus of claim 1, wherein the first and/or the second connector is a bus or tag adapter which converts a first or external wiring/terminal connection scheme, grid or geometry to a second or internal wiring/terminal scheme, grid or geometry.

8. The apparatus of claim 1, wherein the second connector connected to the first converter adapter can be contained within a box approximately 1 inch (2.54 centimeters) by 4 inches (10.16 centimeters) by 4.5 inches (11.43 centimeters).

9. The apparatus of claim 1, wherein the integrated circuit means further emulates TAG signals thereby reducing signal delays introduced by the apparatus including cable induced delays.

10. The apparatus of claim 1, wherein the integrated circuit means comprises:

an erasable programmable logic device, a nonerasable programmable logic device, or a custom design programmable logic device;

a transmitter section including a serializer for receiving a plurality of parallel multiplexed signals from the programmable device over conductive paths, encoding the signals, serializing the signals, converting the signals to emitter coupled logic (ECL) levels and shifting the converted signals out on a conductive path; and a receiver section including a deserializer for receiving serialized signals and continuously deserializing, decoding and latching parallel data through parallel conductive paths to the programmable device.

11. The apparatus of claim 10, wherein the converter adapter further comprises:

a printed circuit board with conductive paths;

one or more fifth connector connecting the second end of the first multi-line cable assembly and some of the conductive paths;

one or more sixth connector connecting the second connector and some of the conductive paths;

one or more seventh connector for connecting some of the conductive paths to one or more power sources;

a receiver connector connected to some of the conductive paths and for connecting to a connector on one end of the dual line cable assembly to receive signals over one of the lines in the dual line cable assembly; and a transmitter connector connected to some of the conductive paths and for connecting to the connector on the end of the cable assembly to send signals over the other one of the lines in the dual line cable assembly.

12. The apparatus of claim 11, wherein the converter adapter further comprises:

terminator networks connected by some of the paths to the fifth and sixth connectors; and line drivers/receivers connected by some of the paths to the terminator networks and to programmable device.

13. The apparatus of claim 12, wherein the transmitter section further comprises:

an ECL to current translator connected by paths to the serializer and the transmitter connector.

14. The apparatus of claim 13, wherein the receiver section further comprises:

a photodiode and preamplifier for converting optical light pulses received from the dual line cable assembly to an analog voltage output; and a data quantizer connected by paths to the photodiode and preamplifier and the deserializer, the data quantizer amplifies and converts the analog voltage signals to a constant level output that is ECL compatible.

15. The apparatus of claim 1, wherein said first converter adapter is configured to transmit bus and tag information on said dual-line cable assembly a distance exceeding about 500 feet and configured to receive bus and tag information on said dual-line cable assembly from a distance exceeding about 500 feet.

16. An apparatus for use in connecting a first computer device and a second computer device through a dual line cable assembly, the first and second computer devices each having first and second electrical interfaces having a plurality of rows and columns of bus and tag inputs and outputs, comprising:

a first connector for connecting to the second interface in the first device;

a converter adapter adjacent and connected to the first connector and being adapted for connection to the dual line cable assembly, the converter adapter comprising:

a printed circuit board with conductive paths;

one or more second connectors connected to at least some of the conductive paths for receiving signals from the first interface in the first device;

one or more third connectors connecting the first connector and some of the conductive paths;

one or more fourth connectors for connecting at least some of the conductive paths to one or more power sources;

a receiver connector connected to at least some of the conductive paths and for connecting to a connector on one end of the dual line cable assembly to receive signals over one of the lines in the dual line cable assembly; and a transmitter connector connected to at least some of the conductive paths and for connecting to the connector on the end of the cable assembly to send signals over the other one of the lines in the dual line cable assembly;

terminator networks connected by at least some of the paths to the second and third connectors;

line drivers/receivers connected by at least some of the paths to the terminator networks;

integrated circuit means connected to the line drivers/receivers for (1) multiplexing and then serializing parallel bus and tag information received from the first and second interfaces in the first device and sending such multiplexed serial information over a first line of the dual line cable assembly and (2) deserializing and then demultiplexing serial bus and tag information received from a second line of the dual line cable assembly from the second computer device and sending such parallel and demultiplexed information to the first and second interfaces of the first device, wherein the integrated circuit means comprises:

an erasable programmable logic device, a nonerasable programmable logic device, or a custom design programmable logic device, the device connected by at least some of the paths to the line drivers/receivers;

a transmitter section including;

a serializer for receiving a plurality of parallel multiplexed signals from the programmable device over conductive paths, encoding the signals, serializing the signals, converting the signals to emitter coupled logic (ECL) levels and shifting the converted signals out on a conductive path; and an ECL to current translator connected by at least some of the paths to the serializer and the transmitter connector; and a receiver section including a deserializer for receiving serialized signals and continuously deserializing, decoding and latching parallel data through parallel conductive paths to the programmable device.

17. The apparatus of claim 16, wherein said converter adapter is configured to transmit bus and tag information on said dual-line cable assembly a distance exceeding about 500 feet and configured to receive bus and tag information on said dual-line cable assembly from a distance exceeding about 500 feet.

18. An apparatus for use in connecting a first computer device and a second computer device through a dual line cable assembly, the first and second computer devices each having first and second electrical interfaces having a plurality of rows and columns of bus and tag inputs and outputs, comprising:

a first bus and tag sub-assembly including:
a first connector for mating with the first interface in the first device,
a first converter adapter connected to the first connector,
a first multi-line cable assembly having a first end and a second end, the first end connected to the first converter adapter,
a second converter adapter connected to the second end of the first multi-line cable assembly and being adapted for connection to the dual line cable assembly,
a second connector connected to the second converter adapter, the second connector assembly for mating with the second interface in the first device, and
the first and second converter adapter including integrated circuit means for (1) multiplexing and then serializing parallel bus and tag information received from the first and second interfaces in the first device and sending such multiplexed serial information over a first line of the dual line cable assembly to the second computer device and (2) deserializing and then demultiplexing serial bus and tag information received through a second line of the dual line cable assembly and sending such parallel and demultiplexed information to the first and second interfaces of the first device.

19. The apparatus of claim 18, wherein the integrated circuit means emulates TAG signals thereby reducing signal delays introduced by the apparatus including cable induces delays.

20. The apparatus of claim 18, wherein said first and second converter adapters are configured to transmit bus and tag information on said dual-line cable assembly a distance exceeding about 500 feet and configured to receive bus and tag information on said dual-line cable assembly from a distance exceeding about 500 feet.

21. An apparatus for use in connecting a first computer device and a second computer device through a pair of dual line cable assemblies, the first and second computer devices each having first and second electrical interfaces having a plurality of rows and columns of bus and tag inputs and outputs, comprising:

a first connector for mating with the first interface in the first device;
a first converter adapter connected to the first connector;
a second connector for mating with the first interface in the second device;
a second converter adapter connected to the second connector;
a first dual line cable assembly of the pair of assemblies having a first end and a second end, the first end of the first dual line cable assembly connected to the first converter adapter and the second end of the first dual line cable assembly connected to the second converter adapter;
a third connector for mating with the second interface in the first device;
a third converter adapter connected to the third connector;
a fourth connector for mating with the second interface in the second device;
a fourth converter adapter connected to the fourth connector;
a second dual line cable assembly of the pair of assemblies having a first end and a second end, the first end of the second dual line cable assembly connected to the third converter adapter and the second end of the second dual line cable assembly connected to the fourth converter adapter; and
the converter adapters including integrated circuit means for (1) multiplexing and then serializing parallel bus and tag information received from the first and second interfaces in either the first device or the second device and sending such multiplexed serial information over the first and second dual line cable assemblies and (2) deserializing and then demultiplexing serial bus and tag information received through the dual line cable assemblies and sending such parallel and demultiplexed information to the first and second interfaces of the either the first device or the second device.

22. The apparatus of claim 21, wherein the integrated circuit means emulates TAG signals thereby reducing signal delays introduced by the apparatus including cable induced delays.

23. The apparatus of claim 21, wherein each of said converter adapters is configured to transmit bus and tag information on said dual-line cable assembly a distance exceeding about 500 feet and configured to receive bus and tag information on said dual-line cable assembly from a distance exceeding about 500 feet.

24. An apparatus used in connecting a plurality of computer devices using a dual line cable assembly, each computer device having at least two electrical interfaces, comprising:

at least one converter adapter operatively coupled to at least one of the interfaces of each computer device, said dual line cable assembly having a first end connected to one converter adapter coupled to one computer device and having a second end connected to one converter adapter coupled to another computer device; and
each converter adapter being configured for (1) multiplexing and then serializing parallel bus and tag information received from the interfaces of the computer device to which the converter adapter is operatively coupled and sending such multiplexed serial information over the dual line cable assembly to the other computer device and (2) deserializing and then demultiplexing serial bus and tag information received through the dual line cable assembly and sending such parallel and demultiplexed information to the interfaces of the computer device to which the converter adapter is operatively coupled.

25. The apparatus of claim 24, wherein each computer device has at least a first and a second interface.

26. The apparatus of claim 25, wherein one converter adapter is operatively coupled to only one of the first and second interfaces of each of the plurality of computer devices.

27. The apparatus of claim 25, wherein one converter adapter is operatively coupled to each of the first and second interfaces of each of the plurality of computer devices and wherein two dual line cable assemblies are used to connect together two computer devices.

28. The of claim 25, further comprising:
   at least one bus and tag sub-assembly comprising:
      a first connector for mating with the first interface of a first of the plurality of computer devices,
      a first multi-line cable assembly having a first end and a second end, the first end connected to the first connector and the second end connected to one converter adapter,
      a second connector connected to the one converter adapter and being connected with the second interface in the first device.

29. The apparatus of claim 28, wherein a second converter adapter is connected between the first connector and the multi-line cable assembly in at least one of the bus and tag sub-assemblies.

30. The apparatus of claim 24, wherein the converter adapter comprises:
   a printed circuit board with conductive paths;
   one or more first connectors connected to at least some of the conductive paths for receiving signals from a first of the two electrical interface in a first of the plurality of computer devices;
   one or more second connectors connecting the first connector and some of the conductive paths;
   one or more third connectors for connecting at least some of the conductive paths to one or more power sources;
   a receiver connector connected to at least some of the conductive paths and for connecting to a connector on one end of the dual line cable assembly to receive signals carried by the dual line cable assembly;
   a transmitter connector connected to at least some of the conductive paths and for connecting to the connector on the end of the dual line cable assembly to send signals over the dual line cable assembly;
   terminator networks connected by at least some of the conductive paths to the first and second connectors;
   line drivers/receivers connected by at least some of the conductive paths to the terminator networks;
   integrated circuit means connected to the line drivers/receivers for (1) multiplexing and serializing parallel bus and tag information received from the first and second interfaces in the first device and sending such multiplexed serial information over a first line of the dual line cable assembly and (2) deserializing and then demultiplexing serial bus and tag information received from a second line of the dual line cable assembly from a second of the plurality of computer devices and sending such parallel and demultiplexed information to the first and second interfaces of the first device, wherein the integrated circuit means comprises:
      an erasable programmable logic device, a nonerasable programmable logic device, or a custom design programmable logic device, the device connected by at least some of the paths to the line drivers/receivers;
      a transmitter section including;
         a serializer for receiving a plurality of parallel multiplexed signals from the programmable device over conductive paths, encoding the signals, serializing the signals, converting the signals to emitter coupled logic (ECL) levels and shifting the converted signals out on a conductive path; and
         an ECL to current translator connected by at least some of the conductive paths to the serializer and the transmitter connector; and
      a receiver section including a deserializer for receiving serialized signals and continuously deserializing, decoding and latching parallel data through parallel conductive paths to the programmable device.

31. The apparatus of claim 24, wherein the integrated circuit means emulates TAG signals thereby reducing signal delays introduced by the apparatus including cable induced delays.

32. The apparatus of claim 24, wherein each of said converter adapters is configured to transmit bus and tag information on said dual-line cable assembly a distance exceeding about 500 feet and configured to receive bus and tag information on said dual-line cable assembly from a distance exceeding about 500 feet.

* * * * *